PHONOGRAPH BASE AND DUST COVER THEREFOR

Filed July 17, 1968

5 Sheets-Sheet 1

INVENTOR.
STANLEY BINDMAN
RALPH M. VERNI
BY Jerome Bauer
ATTORNEY

INVENTOR.
STANLEY BINDMAN
RALPH M. VERNI
BY Jerome Bauer
ATTORNEY

PHONOGRAPH BASE AND DUST COVER THEREFOR

Filed July 17, 1968

INVENTOR.
STANLEY BINDMAN
RALPH M. VERNI
BY
ATTORNEY

PHONOGRAPH BASE AND DUST COVER THEREFOR

Filed July 17, 1968 5 Sheets-Sheet 4

INVENTOR.
STANLEY BINDMAN
RALPH M. VERNI

BY Jerome Bauer

ATTORNEY

PHONOGRAPH BASE AND DUST COVER THEREFOR

Filed July 17, 1968

5 Sheets-Sheet 5

INVENTOR.
STANLEY BINDMAN
RALPH M. VERNI
BY Jerome Bauer
ATTORNEY

United States Patent Office 3,549,224
Patented Dec. 22, 1970

3,549,224

PHONOGRAPH BASE AND DUST COVER THEREFOR

Stanley Bindman, Roslyn Heights, and Ralph M. Verni, Baldwin, N.Y., assignors to British Industries Corporation, Westbury, N.Y., a corporation of New York Filed July 17, 1968, Ser. No. 745,600
Int. Cl. A47b *81/06*
U.S. Cl. 312—8 30 Claims

ABSTRACT OF THE DISCLOSURE

A phonograph cabinet including a base for supporting a turntable mechanism, a dust cover enclosing said mechanism and means for allowing the cover to be pivoted, lifted or moved horizontally with respect to the base.

BACKGROUND AND SUMMARY OF THE INVENTION

The present invention relates to phonograph turntable cabinets and, in particular, to improvements to the base and dust covers therefor.

It is well-known that there is a large and sophisticated market for highly expensive electronic sound reproducing equipment, including those mechanical components of phonograph turntables, pick-up arms, etc. Since there is a direct correlation between the fidelity of performance and the life of the component with the degree of workmanship and materials employed, the more advanced components comprise precision made instruments of delicacy and performance. Consequently, it is necessary that they be carefully housed in suitable cabinetry assuring performance and fidelity and maintaining the quality of the instrument both during storage and operation.

It is an object of this invention to provide a phonograph turntable and pick up arm sometimes referred to, in combination, only as the "turntable" cabinet for securely housing the turntable in perfect performance and to protect the instrument from physical damage.

In general, such cabinets comprise a hollow base, polygonal in shape, having a flat peripheral lip extending within it for support of the turntable mechanism, the surface of the turntable mechanism being adapted to be placed on the lip so that its upper surface is on a plane slightly raised from the top edge of the base with the pick-up arm and controls raised thereabove. The operative mechanism of the turntable is supported and enclosed within the polygonal structure itself. A dust cover is provided which is generally of plastic or other transparent material, formed to conform with the polygonal shape of the base and having a raised top and opening bottom so as to enclose the pick-up mechanism and controls.

In constructing the bases of the prior art, much effort had to be taken to see that various parts were perfectly square and true so that the turntable would be supported in balance and that it was level with the horizontal. It is an object of this invention to simplify the construction of the base by avoiding its manufacture as a number of separate parts requiring fastening of such parts together. Accordingly, this invention provide a unitary base member, integrally formed.

Prior art devices were also generally lacking in conveniently positioned facilities for the storage of accessories such as needles, spindles and record holding discs. It is an object of this invention to provide storage spaces for a variety of accessories, easily reached from the level of the turntable, without interference with the movement of the pick-up arm.

It is to be noted that in many instruments, the pick-up arm is counterweighted and balanced about a pivot point so that the weight of the needle is reduced to the minimum at its point of contact with the phonograph record. Generally, the counterbalance is of such size that during operation it moves out of the vertical confines of the base and overhangs the extent thereof. Thus, prior art cabinets cannot be employed in tight locations. It is an object of this invention to provide a base designed so that the tone arm remains within the side vertical confines of the base.

Turning our attention to the dust cover, it has been noted that in the past they generally assumed the shape of the base, i.e., for a rectangular base, they comprised four sides and a top. In any event, such covers had to be placed on the base or removed therefrom with a truly vertical movement and required substantial height above the base for manipulation. It is an object of this invention to provide a dust cover which can be removed from the base by sliding it off the base with a single horizontal movement that requires no height clearance. Thus, the present cabinet may be used in confined areas and in facilities such as shelves, bookstacks, etc., having limited vertical clearance or space.

With the prior art devices, it was also impossible to operate the phonograph (that is, place records thereon or manipulate the pick-up arm) without the complete removal of the dust cover. It is an object of this invention to also provide the cabinet with means for hinging the cover to the base so that it may be tilted or hinged open easily, and held in its open position to allow access for loading and unloading of the turntable without its removal from the base.

It is more specifically intended that the dust cover and base combination be such that operation of the turntable is not effected by the position of the cover; that the cover may be opened and closed even when the device is working but that the cover cannot be inadvertently closed on records or instrumentalities of the turntable as to damage them.

BRIEF DESCRIPTION OF THE DRAWINGS

While the objectives of the present invention are comprehensive, they will be readily apparent from the following description. In addition, further objects and advantages will be set forth in the following description. The preferred embodiment of this invention, illustrative and not limiting of its adaptation generally to phonograph turntable cabinetry construction is set forth with reference to the accompanying drawings in which.

DESCRIPTION OF THE PREFERRED EMBODIMENTS

Figure 1:
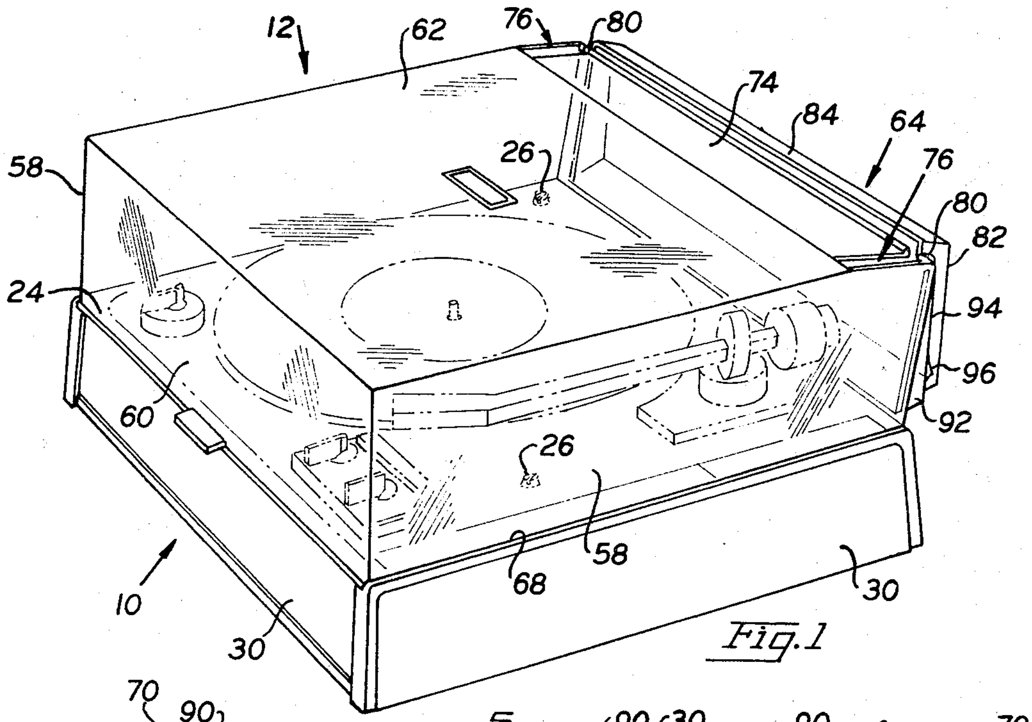
FIG. 1 is a perspective view of base, dust cover and turntable components.

Turning now to FIG. 1, there will be seen in dotted lines a phonograph turntable and pick-up assembly mounted in a base generally identified 10 and covered with a clear transparent dust cover generally identified 12 which is pivotal with respect to the base as will be explained more fully hereinafter. In the generally arrangement, the combined base and dust cover presents a pleasing and attractive design which of course is advantageous in making the device marketable.

The base 10 (FIGS. 2–5) comprises a unitary polygonally-shaped generally rectangular frame having four sloping supporting walls 14. The supporting walls 14 are provided with inturned flanges 16 along their bottom edges which add strength and rigidity to the frame. A plurality of supporting feet 18 are also provided. The walls 14 terminate at their upper ends in a ledge or substantially horizontal platform 20 that merges with another wall 22. This latter wall then terminates in a second ledge or substantially horizontal platform 24 that is vertically spaced from and higher than the first platform 20. The first platform 20 is shaped to conform to the contours and outline of the phonograph turntable and is provided with means for receiving and securing the turntable to it. The exact shape of the platform 20, of course, will vary with respect to the turntable and, therefore, the contour shown in the figures should not be taken as critical. The means for securing the turntable to the platform will of course depend upon the turntable employed. In this invention, a fastening means or bolt assembly 26 is employed for fastening. Accordingly, a novel inverted T-shaped opening means generally identified by the numeral 28 (to be described in complete detail later in connection with FIG. 6) for receiving the bolt 26 is here noted.

The second platform 24 is about and along the periphery of the frame and extends to the extreme edges of the base 10. Along the periphery of the upper platform 24 there is a depending skirt 30 which is slightly flared outwardly and which completely surrounds the vertical supporting walls 14. The skirt 30 is decorative and may be provided accordingly with a suitable finish of wood, metal or other design.

Figure 2:
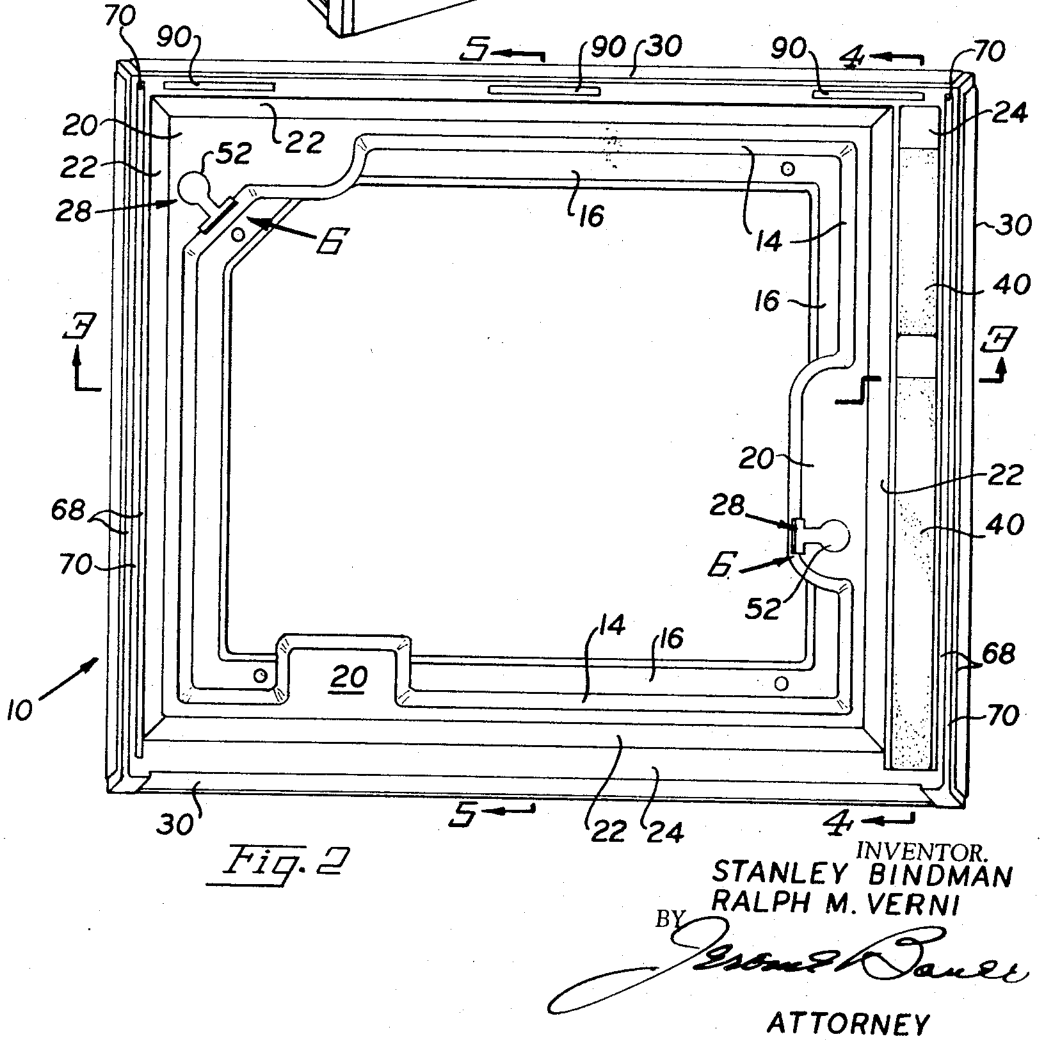
FIG. 2 is a top plan view only of the base shown in FIG. 1.
Figures 3, 4, 5:
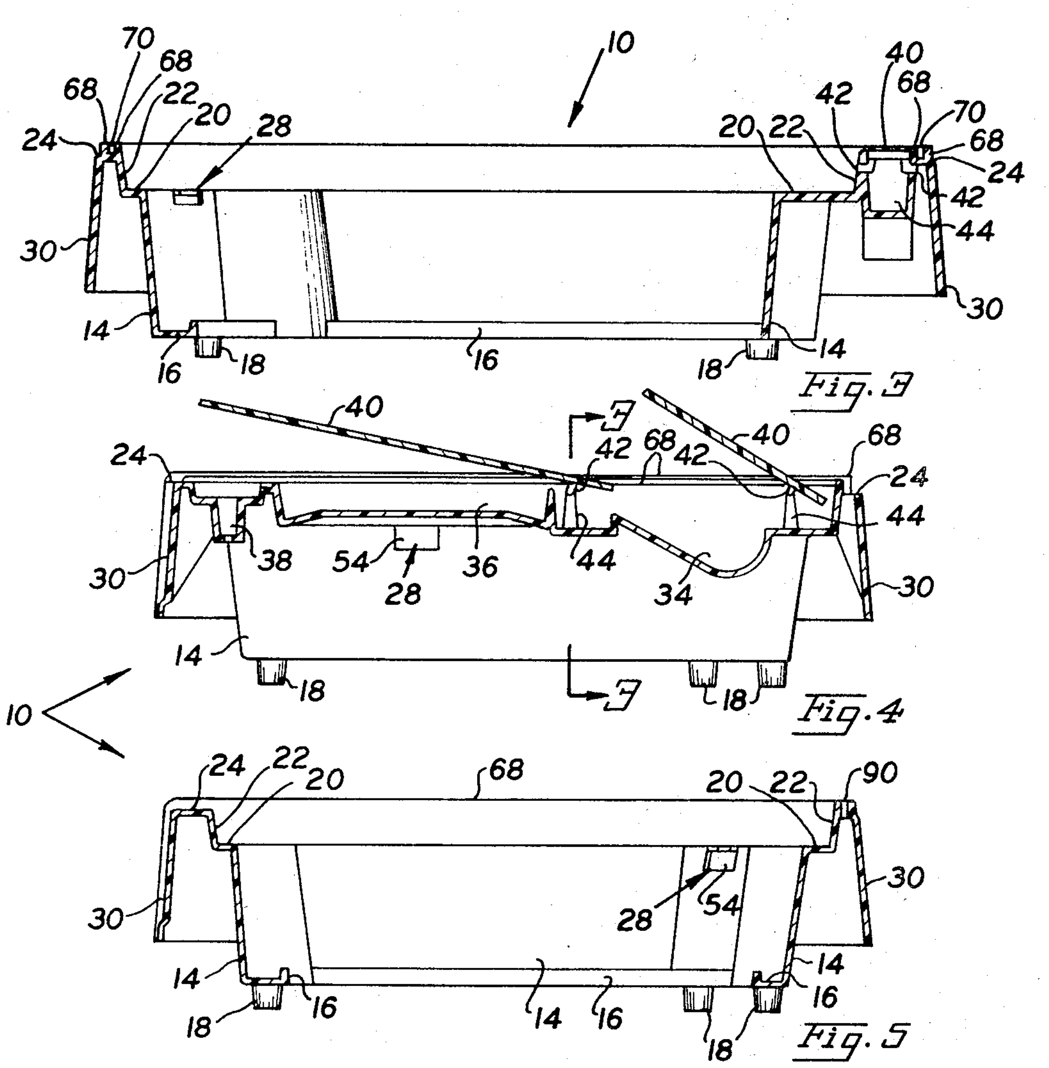
FIG. 3 is a sectional view of the base along line 3—3 of FIG. 2.
FIG. 4 is a sectional view of the base along line 4—4 of FIG. 2.
FIG. 5 is a sectional view of the base along line 5—5 of FIG. 2.

The right-hand side of the upper platform 24, as seen in the FIGS. 2 and 3, is larger in width than that of the other co-planar platform edges and, consequently, the skirt 30 at this side extends some lateral distance from the corresponding supporting walls 14. This wider platform edge is provided with three built-in pockets or compartments 34, 36, and 38 (FIG. 4). The compartments depend below the level of the upper platform 24 and laterally between the corresponding skirt 30 and wall 14. The rearmost compartment 34 is provided with a curved bottom and is particularly adapted for receiving and retaining a manual plug for large hole 7" records. The central compartment 36 is elongated. It has a flatter bottom and is particularly adapted for retaining the automatic spindle and record posts employed with such devices. The third compartment 38 is generally circular in shape and is the smallest. It may be employed to retain the manual spindle.

The compartments are covered with a pair of rigid flat flaps 40 pivotally mounted above the openings. The flaps are provided with laterally extending pivot trunnions 42 adapted to cooperate with suitable bearing posts 44 secured respectively to the bottom of each compartment. The pivot point of the trunnions 42 is offset from the center, preferably closer to the rear of the flap 40, so that it may be tilted by manually depressing the rear, thereby providing access to the compartment from the front thereof. The number, relative position and depth of the compartments are not at all critical and may be varied or alternated as desired.

Returning to FIGS. 1 and 2, it will be observed that the compartments are located so that the flaps 40 rest on the platform 24, and while spaced from the pick-up arm, are along the side of the base 10 where the pick-up arm of the turntable is mounted. The flaps 40 may thus be opened without interfering with the pick-up arm and when they are closed they will not block the swinging movement of the pick-up arm across the record. It will also be observed that the extreme edges of the right hand side skirt 30 of the base 10 is removed from the pick-up arm by at least the width of the compartments 34, 36, and 38, enabling, as will be clear, the full swing of the rear end of the pick-up arm without its rear end extending over and beyond the side vertical confines of the base. This same combination and effect can, of course, be obtained along any side of the base that the pick-up arm is placed.

Figure 6:
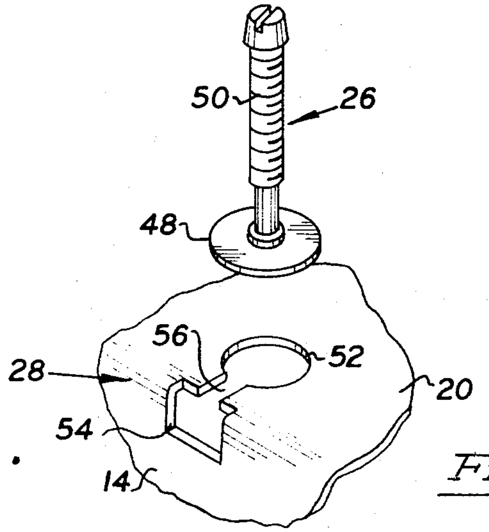
FIG. 6 is a perspective view along sight line 6 of FIG. 2 showing the receiving and retaining opening for the turntable mounting.

It will be recalled that the base 10 is provided with a novel recess 28 for reception of the mounting bolt 26. With reference to FIG. 6, the mounting bolt 26 normally includes an enlarged head or engaging surface 48 assembled with a stem or post 50 for the purpose of mounting the turntable to the base against shock in transit and for leveling during operation. In the past, the ordinary base was provided merely with a small hole for insertion of the bolt, necessitating the removal of a retaining nut from the assembly before insertion. The factory worker consequently had to turn over both turntable and the base to manipulate the nut back on to the bolt before the turntable could be secured. The present construction avoids this difficulty and simplifies assembly of the turntable with the base by locating the receiving recess 28 adjacent the edge of the platform 20 and the vertical wall 14. The recess 28 comprises a circular opening 52 in the platform 20 and a rectangular opening 54 in the wall 14 joined by an open keyway 56. Thus, the stem 50 and the enlarged head 48 of the bolt 26 is admitted sidewise and inserted through opening 54 of the recess 28 without removal of the head from the bolt. Thereafter, the bolt 26 may be manipulated directly to tighten and loosen the assembly in cooperation with other structure not shown without inverting the base.

It will now be appreciated that the present invention provides a base 10 which is not only decorative but which has unusual features that are novel in the art. Namely, a unitary rigid construction, compartment provision for accessory storage and novel retaining means for the fastening bolt. The entire base is preferably made of an integrally molded plastic material. In this manner, strength, rigidity, design, and function can be simultaneously and easily obtained, providing the sought after objective of correct alignment and dimensional stability, together with the provision of the novel constructional features. However, in the event that alignment and stability are not of importance, the base can be fabricated of two or more pieces of metal, plastic and/or wood and still provide the novel constructional features, there being no known factor which would preclude such construction. Furthermore, the base may be of other polygonal shapes and not necessarily rectangular.

Returning to FIG. 1, it will be recalled that the base is provided with a pivotal dust cover 12. Unlike the prior art, dust covers, which were of a single piece five-sided construction having four rectangularly aligned walls and an interconnecting domed or flat top, the present dust cover comprises an easily removable four-sided member having a pair of opposed side panels 58, a front panel 60 and a top panel 62. A separate back member 64 fixed to the base 10 is employed as the remaining enclosing side of the dust cover, and as will be explained later it forms a part of a hinge mechanism for permitting the cover 12 to be pivotally raised over the base.

The panels 58 and 60 are preferably made of thin molded plastic and have their lower edges 66 coplanar and adapted to ride on the surface of platform 24 of the base 10. To facilitate this, the platform 24 is provided with a pair of elongated parallel ridges 68 forming a guide groove 70 between them that extends front to rear of the base along each of its side edges (FIGS. 2 and 4). The lower edge of the front panel 60 is adapted to overlay and fit smoothly on the front portion of the platform 24. The dust cover 12 is restrained from lateral movement with respect to the base 10 while it is permitted front to rear sliding movement by and within the groove 70. Rearward movement of the cover 12 is defined by both the back member 64 and the abutment of the front panel 60 with the inner ones of the guide ribs 68. Because the cover 12 does not have a rear panel, there is no restraint to its forward movement and it may be thus completely slid forward, free from the base. This will, of course, be readily seen to be an advantage not afforded by prior art dust covers which, because of their five-sided construction, had to be lifted vertically some distance above the turntable before it could be moved forward or completely removed from the phonograph structure. Since the dust cover 12 here may be slid off the base without any vertical lifting, the entire device may be stored on a shallow shelf, narrow bookcase or other heretofore unusable space. In sliding the cover within the guide grooves 70, the cover is accurately guided to prevent contact either with the sensitive pick-up arm or the fragile record, thus avoiding damage to either.

Figures 7, 8, 13:
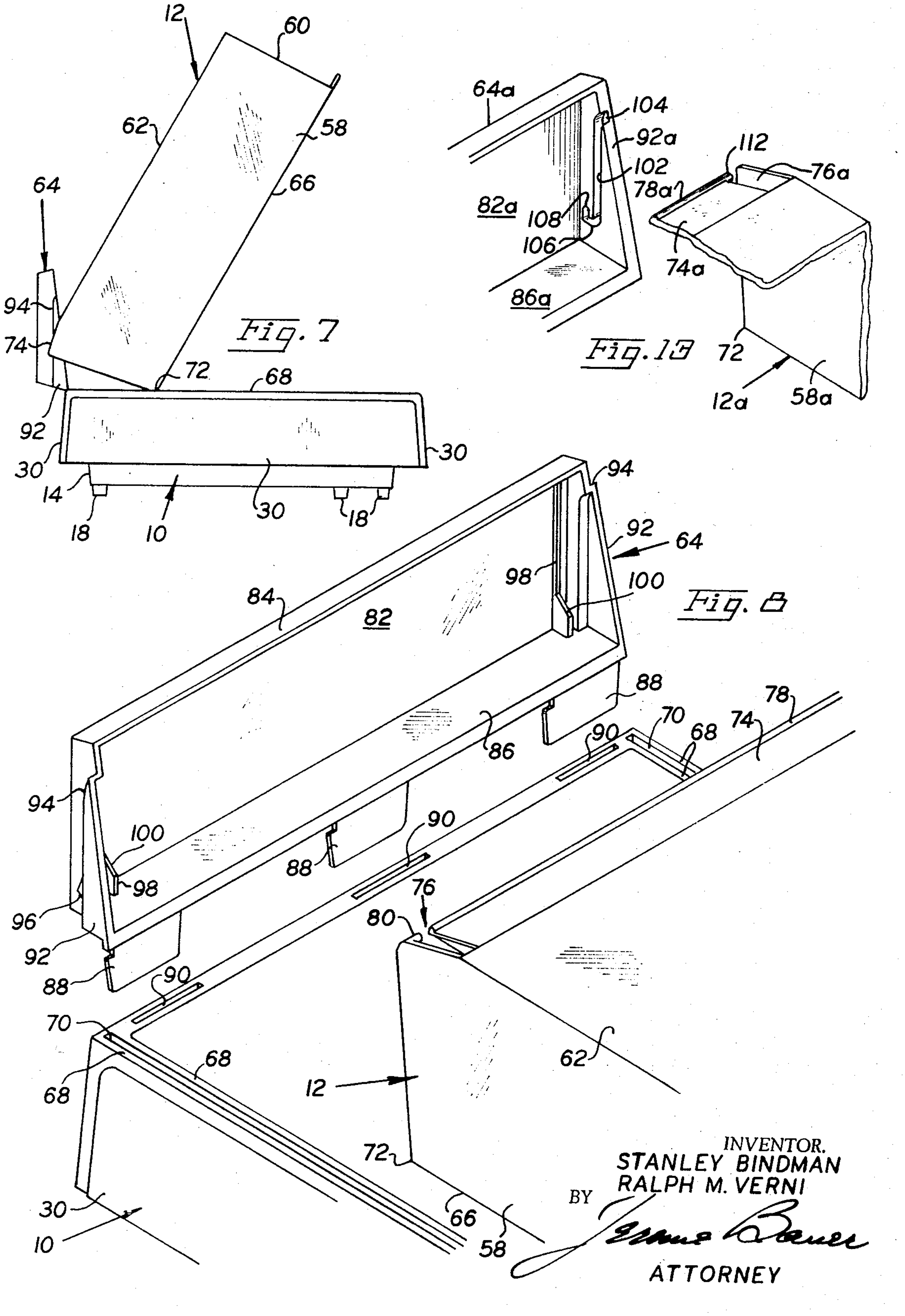
FIG. 7 is a view showing the cover raised.
FIG. 8 is an expanded perspective view of the base, cover and hinge connecting means, FIGS. *9a–9d* are views showing the operation of and arrangement of the parts of FIG. 8 during various stages in the raising of the cover.
FIG. 13 is an expanded perspective view similar to that of FIG. 9 showing a modified hinge connecting means.

Further, the absence of a back panel on the dust cover 12 enables the cover to be raised from front to rear while still resting on the base in the manner shown in FIG. 7. As seen in this figure, the rear corner 72 of the bottom edges 66 of each side panel 58 is maintained within the groove 70 on the upper platform of the base 10 providing thereat a fulcrum for the cover. The cover may then be rotated open to any position, exposing the whole of the turntable without contact with the turntable, record or other mechanism mounted or supported on the base 10. The phonograph may be freely operated without interference in this open condition.

Figure 10:
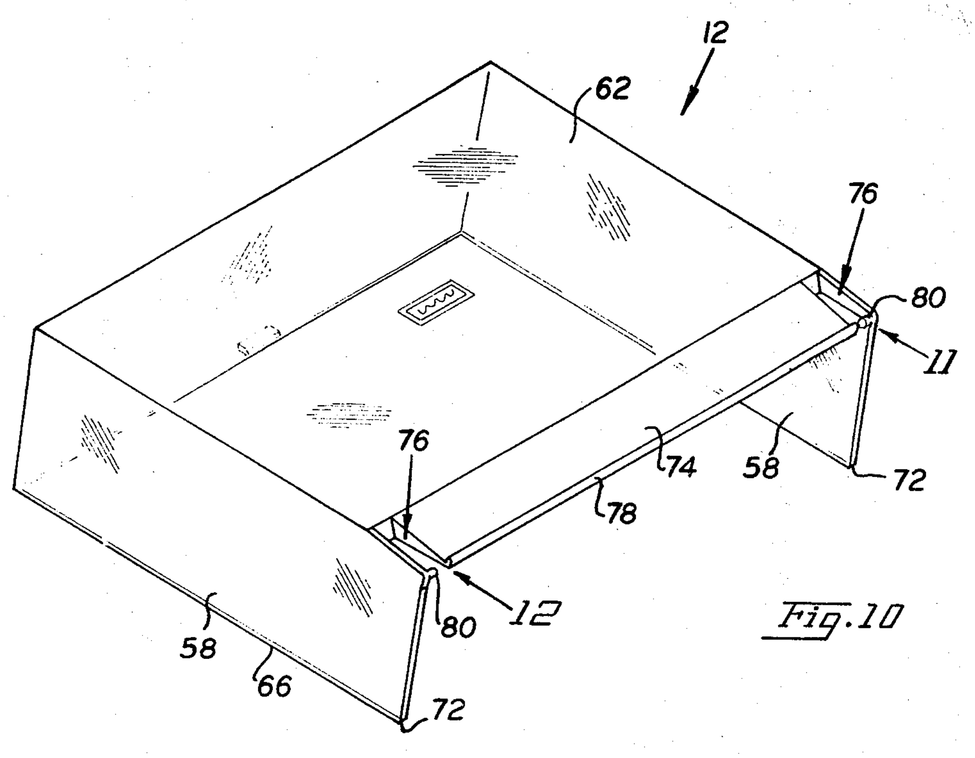
FIG. 10 is a perspective view of the cover of FIG. 1 showing its rear edges.
Figure 11:
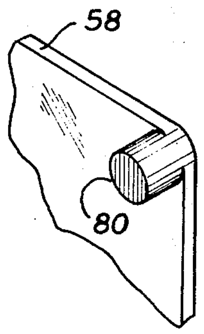
FIG. 11 is a perspective view along sight line 11 in FIG. 10.
Figure 12:
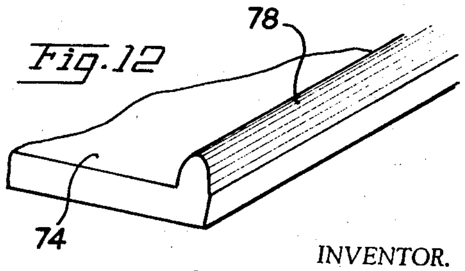
FIG. 12 is an end view along sight line 12 of FIG. 10.

To facilitate the raising of the cover 12 and to provide for its stable positioning, the cover and the back member 64 each are provided with cooperating interconnecting hinge means. As seen in FIGS. 8 and 10, the rear 74 of the top panel 62 of the cover 12 is separated and disconnected from the corresponding edge of the side panels 58 so as to provide a slot generally identified by numeral 76. This rearmost portion 74 is sloped downwardly at a slight angle and is provided with a bead 78 along its entire length. The bead 78 extends upward and is rounded, as seen clearly in FIG. 12. The side panels 58 of the cover 12 each is provided with a round pin member 80, extending laterally inwardly of its respective slot 76. The pin 80 extends rearwardly of the line of bead 78, a slight distance, as seen in FIGS. *9a* to *9d*.

The back member 64 (FIG. 8) comprises a vertical wall 82 integral with an extended top 84 and a floor 86 adapted to be releasably secured to base 10. The floor 86 is provided with a plurality of bayonet-type locking members 88 which are received in corresponding cut-out slots 90 formed in the upper platform 24 along the rear edge of the base 10. This type of locking means is most convenient in providing for a detachable back member but may be replaced with any other convenient means or another detachable latch mechanism.

The vertical wall 82, top 84 and floor 86 are interconnected by angular corner members 92 at each end. Each corner member 92 is a mirror image of the other and is provided with a curved shoulder 94 on its outer surface extending from a point below the extreme upper edge of the corner member 92 to a position substantially co-planar with the floor 86. The shoulder 94 is provided with a rearwardly pointed angular detent 96 intermediate its length. Within the back member 64, itself, at equal distances from the corners thereof are located at least two vertical supporting ribs 98, provided with a smooth contoured edge 100 running vertically from the top to a point substantially at a level with the detent 96 and thence angularly downwardly parallel to the detent 96 to a point just above the floor 86.

The linear extent of the back member 64 from the outer surface of one corner 92 to the outer surface of the other corner 92 is slightly less than the distance between side panels 58 of the base 10. Thus, as will be seen in FIG. 1, the rear edge of the side panels 58 will slightly overlap the edges of each of the corner members 92 and the pins 80 thereof will fit over the shoulders 94. The slot 76 is also made sufficiently wide to permit the entry of the corner members 92 therein so that the rearmost part of the cover 12 may be made to straddle the vertically positioned corner 92, with the bead 78 projecting into and within the confines of the back member 64 beneath the edge of the top 84.

The vertical ribs and the shoulders 94, in pair relationship, lie respectively in substantially parallel planes, which as seen schematically in FIGS. *9a* to *9d* are spaced from each other. Consequently, during the rearward thrust or movement of the cover 12 relative to the base 10, the bead 78 is moved into contact with the contoured edge 100 of ribs 98 and the round pins 80 are positioned over their respective shoulders 94.

In FIGS. *9a* to *9d*, the various movements of the cover 12 are schematically shown. FIG. *9a*, for example, depicts the procedure in solid and broken lines for normally placing the dust cover 12 on the base 10 or for removing it therefrom. To enclose the base 10 and its turntable, the cover 12 is moved rearwardly or to the left in the direction of arrow A so that the edges 66 of its side panels 58, lodge in groove 70 and slide front to rear until at least the rear corners 72 abut against the floor 86 of the back member 64. It will be noted again that in its most rearward position, the rear edge of the side panels 58 overlap slightly the edges 92 of the back member 64 and the beaded edge 78 of the top panel projects into and is almost co-extensive with the top of the back member 64 so that virtual sealing against entry of dust or dirt is accomplished. To remove the cover 12, it is simply moved forwardly or to the right in the direction of arrow A until it is completely off the base 10.

FIG. *9b* depicts the initial stage of rotating or tilting the cover 12 open above the base 10. Note that by raising the cover 12 in the direction of arrow B, the upward and rearward thust of the cover places the bead 78 in contact with the contoured edge 100 of rib 98, while simultaneously moving the corners 72 in their guide grooves 70 toward the front of the base. A changing fulcrum point is continually established between the moving corner 72 and the base as the corner fulcrum point 72 is slid forward in groove 70. Meanwhile, the pins 80 integral with the side panel 58 pass beyond and behind the shoulders 94.

It will be noted that during this rotation or pivoting action, the cover 12 is maintained relatively stable with respect to the base 10 and is prevented from sliding off or moving laterally off the base. This is because the cover is maintained in simultaneous contact with the base 10 and the back member 64 at a number of points. First, the panels 58 are in guided contact with the base 10 through their fulcrum corners 72 along guides 70. Second, the bead 78 is in contact with both ribs 98 and third, the ends of pins 80 are in sliding contact with the outer surfaces or backs 94 of the corner members 92.

The raising rotation of cover 12 continues as depicted in FIGS. *9b* and *9c* until it assumes a substantially vertical position. During this movement the bead 78 rides all the way down the ribs 98 and along the edges 100. The direction in which the cover is raised is generally along the path of the arrow C. Simultaneously, the pins 80 ride down the shoulders 94 and are brought into contact with the detents 96 after riding over and below them. This positions the fulcrum points 72 in their most forward position as in FIG. *9c*. Thereafter, when the lifting or raising rearward force is removed from the cover, its own weight positions the pins 80 in direct engagement with the undersides of the retaining detents 96 as in FIG. *9d*. At the same time the bead 78 lifts free of the edges 100.

Thus, FIG. *9d* depicts the condition of the cover 12 on the base 10, when fully raised open and standing freely. When the cover is released from manual control, the fulcrum points 72 remain fixed; however, because of its weight, the cover begins to counter-rotate in the direction of arrow C. This counter rotation carries the pin 80 upwardly into contact with the lower face of the detent 96 where, because of its continued desire to rotate, the cover becomes lodged and consequently locked in the open position. Again, the cover is stabilized by the simultaneous effect produced by the engagement of pins 80 with their detents 96 and at the fulcrum points 72 interacting respectively with their respective grooves 70.

It will be appreciated that even though the side panels 58 may be of rather thin plastic, their shape and position is such that the forces exerted on the pins 80 and the fulcrum points 72 are directly opposed to each other. In consequence of these structural coactions, the panels acquire rigidity and strength. The fact that the bead 78 is, in this condition of FIG. *9d*, removed from contact with the ribs 98 does not effect the cover's stability in open position.

To return the cover 12 to its original closed position over the base 10, the rotation procedure may be reversed if desired. That is to say, a lifting force is applied to the cover to disengage the pins 80 from the detents 96 and then a rearward force slides the pins 80 rearward of the detents. By lowering the cover, points 72 ride in the guides 70 while the bead rides up the ribs 98. By another method, all that is required is to merely push or manually force the cover 12 downwardly in the direction of arrow C (FIG. *9d*) until the retaining forces acting on the pins 80 at the detents 96 respectively are overcome. The cover fulcrum points 72 will then slide in grooves 70, rearwardly, and the pin 80 will override the detent 96. When this finally occurs the cover will thereafter move freely into its closed position.

It will be observed that another unique feature resides in that inadvertent falling or closing of the cover is avoided. This is effected no matter what initial position the cover is in. For example, by referring to FIG. *9b*, it will be noted that the cover is only partially opened. Should it then be inadvertently released, it will tend to rotate downwardly in the direction counter to arrow B, immediately bringing the pins 80 forward and into contact with shoulder 94. The fulcrum points 72, acting as a counterforce forces the pins 80 to lodge against the shoulder 94, maintaining the cover in fixed position and preventing it from being removed horizontally. Although this position is less stable than the position of the cover where its pins 80 are held by detent 96, it is sufficiently strong to provide this failsafe operation.

Figures 9A, 9B:
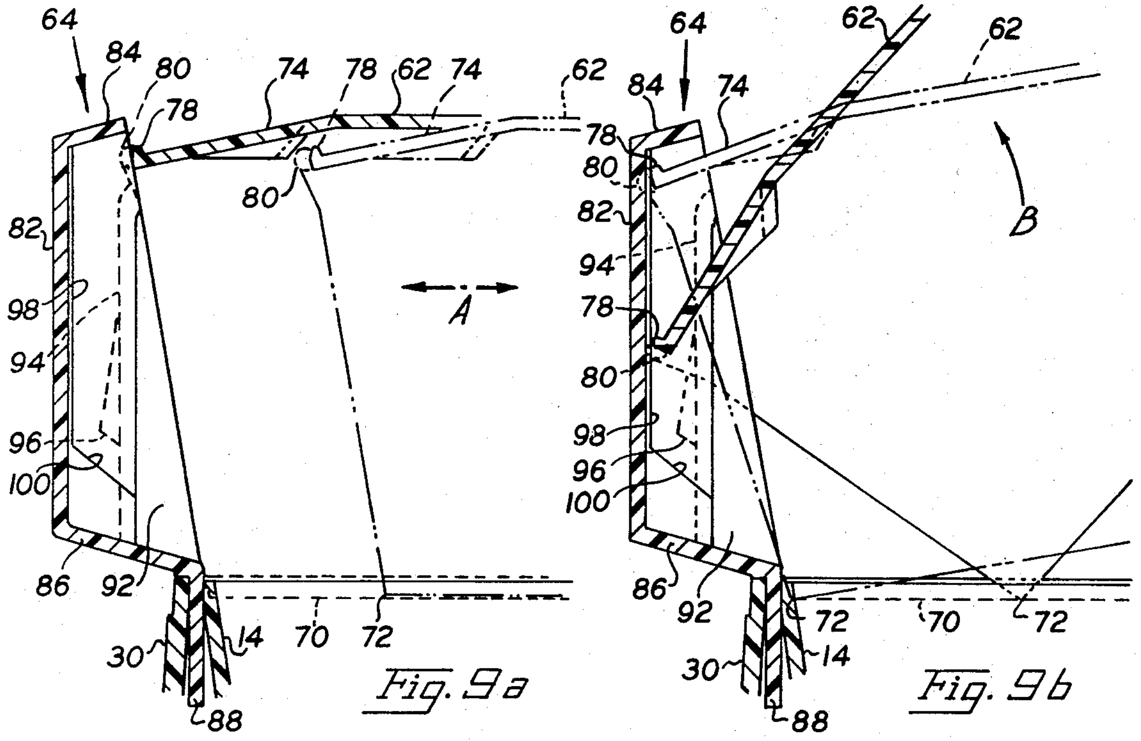
Figures 9C, 9D:
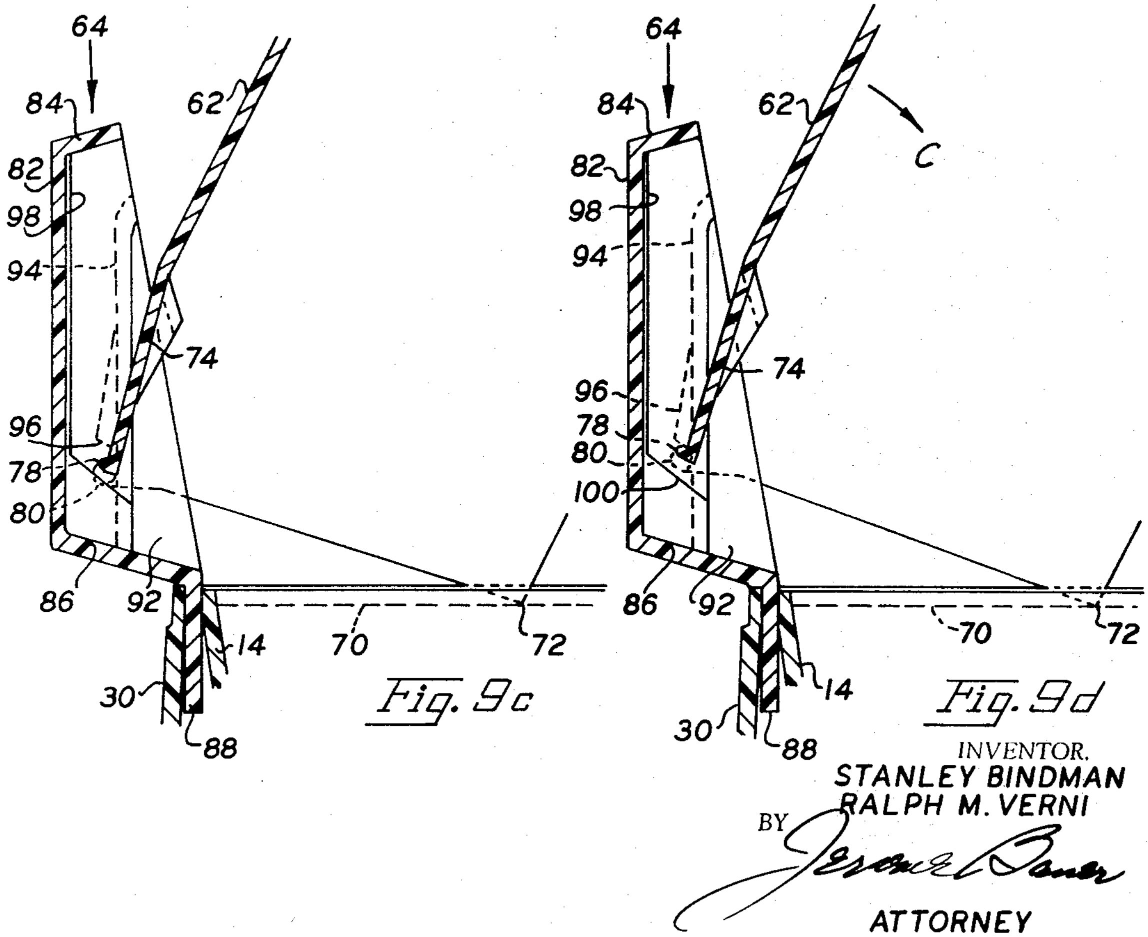

The hinge mechanism formed by the structural interconnections of the back panel and the cover is susceptible to modification in a variety of modes. FIG. 13 shows one such modification. Here it will be seen that the back panel 64a is devoid of guide ribs 98 and detents 96 of the type shown in FIGS. 8 and 9. The back panel 64a is restructured with corner members 92a formed with a reversed substantially Z-shaped groove 102 having a horizontal opening portion 104 extending forwardly at its upper end, and a horizontal portion 106 extending rearwardly, ending near the vertical wall 82a adjacent the floor 86a. The lower horizontal groove portion 106 terminates in an upwardly directed notch-like detent 108. The outer surface of each corner member 92a is smooth.

The modified back panel structure of FIG. 13 and the dust cover itself requires slight modification. Since there are now no longer provided guide ribs, the function of the bead 78 shown in the preceding figures may be eliminated. However, the rearmost top panel portion 74a of the cover 12a must be provided with a set of laterally extending pins 112 which would be adapted to enter into the reverse substantially Z-shaped groove 102. Thus, the slot 76a may be made slightly wider as an accommodation for its respective corner member 92a and the new pins 112, and to permit them to straddle the corner member 92a as discussed previously in connection with the structure shown in FIGS. 7 to 12.

Operatively, this modified structure functions in the manner as that previously described. The cover 12a will slide along the surface of the turntable base and will pivot with respect to the back panel 64a when raised above the base. When pivoted, however, the outer panels 58a ride along the lateral outer surface of the member 92a without any detent or interaction therewith. Simultaneously, the inner set of pins 112 enter and ride within groove 102 where they move downward until they reach the lower horizontal portion 106 and align vertically with the notch detent 108. When the raising or lifting force is relaxed the pins 102 then move upwardly into locking engagement with the detent 108. The cover is thus securely locked in raised position since, unlike the prior structural form, the detent 108 cannot be overridden by any amount of downward force on the cover.

The cover 12a can only be released by again raising it further and positively releasing the engagement of the pins 112 from notch 108 and guiding the cover and pins 112 in movement back through the groove 102 to its closed position. Otherwise, the stabilizing action of the fulcrum points 72 between cover and base, and the action of pins and cover, etc. remain the same as previously disclosed. In this case, as well as in the previous structural form the forward and rear thrust action of the cover 12a results in similar camming action of pins 112 in the grooves 102 respectively while the points 72 move guidingly in the tracks 70.

Figure 14:
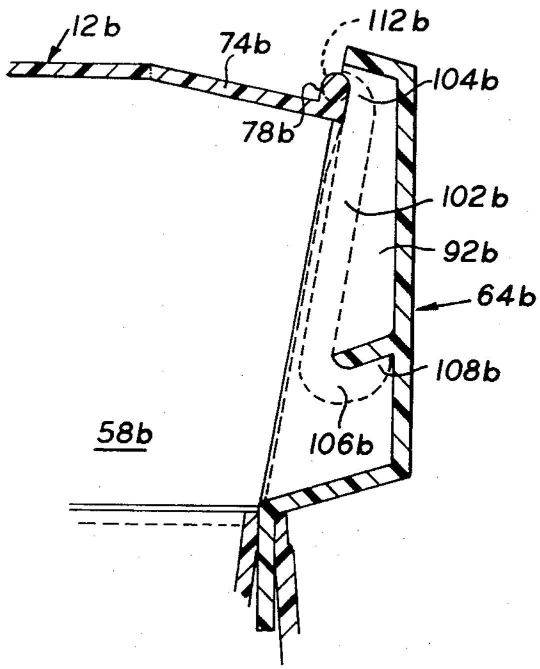
FIG. 14 is a schematic view similar to those of FIG. 9 showing still another modification.

Still another modification to the structure of the cooperating hinge mechanisms is shown in FIG. 14. While this figure is schematic in form, the structural changes will be easily appreciated. In this modification, the back panel 64b is formed with smooth inner surfaces while the back panel 64b is provided with a corner member 92b in which a reversed substantially Z-shaped groove 102b is formed on the lateral outer surface thereof with both its upper and lower horizontal portions 104b and 106b. The rearmost portion 74b of the top panel of the dust cover 12b is also provided with laterally inward extending pins 80b which are received within the groove 102b. This embodiment distinguishes from that of FIG. 13 in that the Z-shaped groove in FIG. 14 is on the outer surface of corner member 92b and the pins 80b project laterally into the grooves.

In operation, the cover and back panel function in the manner as in the prior embodiments, however, because of the contact of the pins 80b with the faces of the groove, and further, because the outer panels 58b ride guidingly along the lateral outer surfaces of the corner members 92b, the stability of movement and positioning of the cover 12b with respect to the base is ensured. In its open and raised position, the cover will positively lock against downward movement, as the pins 80b engage within a notch 108b similar to the action described in connection with the form shown in FIG. 13.

It will be appreciated that the rectangular configuration for base and cover is by way of illustration only.

Other polygonal figures may be employed, with the grooves and sliding surfaces appropriately situated. The back member 64 may of course be located along one edge of any polygonal and shaped appropriately to provide the hinge mechanism shown. Further, suitable other detachable hinging means, may be substituted which would provide those objects and advantages described. Notably, the shoulder surfaces, detent means, guide means, etc. may be modified, in contour, size and shape.

We claim:

1. A cabinet for phonograph turntables and the like, comprising a base for supporting said turntable, a dust cover for substantially enclosing said turntable, said dust cover including a plurality of panels and a top for covering said base, a member secured to said base and forming a part of said dust cover when the same covers said base and separable from said dust cover, and means on said member and cover for interconnecting said cover and base to permit said cover to be moved slidingly along said base and to pivot to an open position relatively thereto.

2. A photograph cabinet for housing a turntable mechanism comprising a turntable base, a dust cover, a back member separable from said dust cover, means on said back member and base cooperable for releasably securing said back member to said base, means on said dust cover and back member releasably cooperable to connect the same together to enable said dust cover to pivot relative to said back member and said base and to move slidingly along said base.

3. The cabinet according to claim 2 including means on said dust cover and base for guiding said dust cover during its movement relative to said base.

4. A phonograph cabinet comprising a substantially polygonal base for receiving a turntable mechanism, a dust cover cooperable with said base for enclosing said turntable, said cover being provided with a number of side panels at least one less than the number of sides of said base, a separate panel member on said base for completing the sides of said cover, said separate panel member and said dust cover being provided with means for releasably hinging the same together to enable said cover to pivot relatively to said back member to an open position relative to said base and to move slidingly relative to said base into and out of enclosing position relative to said base.

5. The cabinet according to claim 4 wherein said base is provided with guide grooves receiving at least one of the side panels for guiding said dust cover as it is pivoted and moved slidingly relative to the base.

6. The cabinet according to claim 4 wherein said means for releasably hinging said dust cover and said separate panel includes means for releasably locking said cover in an open pivoted position.

7. A phonograph cabinet comprising a rectangular base for supporting a turntable mechanism, said base having peripheral edge surfaces at least two of which are opposed and substantially coplanar, a vertical panel extending substantially between said opposed edge surfaces, a dust cover cooperable with said base for enclosing the turntable mechanism, said dust cover being substantially rectangular and provided with three sides, two of which are parallel and have substantially smooth coplanar edges, said edges being adapted to cooperate with the peripheral edge surfaces to permit said cover to slide thereon, whereby said cover may be placed on said base with its open side contiguous to said vertical panel to enclose said turntable.

8. The cabinet according to claim 7 wherein the outer edge of the coplanar peripheral surfaces include a longitudinal rib for retaining said cover thereon against lateral movement.

9. The cabinet according to claim 7 wherein said vertical panel and said cover include cooperable hinge means for releasably interconnecting the same to permit pivoting of said cover with respect thereto.

10. The cabinet according to claim 9 wherein said hinge means includes mechanism for releasably locking said cover in open position with said vertical panel.

11. The cabinet according to claim 7 wherein said dust cover has a top provided with a pair of spaced slots adjacent the opposed parallel sides and said vertical panel is provided with opposed corner members to be received within said cover slots, said corner members and said slots being provided with cooperable hinge means for releasably interconnecting the same to permit pivoting of said cover with respect to said base.

12. The cabinet according to claim 11 wherein the cover is provided with guide follower means extending inwardly of each of said slots and the corner members of the vertical panel are provided with guide means adapted to engage said follower means.

13. The cabinet according to claim 12 wherein said guide follower means comprises a pin extending inwardly of the parallel side panels and a bead extending along the edge of the top side of said cover, and the guide means comprises a surface on the outer face of each of said corner members engaging said pins, and guide surfaces within said vertical wall engaging said bead.

14. The cabinet according to claim 12 wherein said guide follower means comprise a pin extending into each of said slots and the guide means comprise a groove formed on each of said corner members, said pin being adapted to enter in and move within said groove.

15. A phonograph cabinet comprising a base for supporting a turntable mechanism, a dust cover cooperable with said base to enclose the turntable mechanism, a vertical panel member on said base, said panel and said cover having cooperable hinge means releasably interconnecting the two for pivoting said cover with respect to said panel above said base.

16. The cabinet according to claim 15 wherein said vertical panel member and base have means to releasably secure said panel to said base.

17. The cabinet according to claim 15 wherein said panel is provided with guide means and said cover is provided with guide follower means engaging and cooperating with said guide means to effect said hinging mechanism.

18. A phonograph cabinet comprising a base for supporting a turntable mechanism, a vertical panel on said base and having a pair of opposed corner members, a dust cover having a portion provided with opposed edge members, said edge members and said corner members having inter-engaging hinge means for releasably securing said dust cover to said panel to complete an enclosure of the turntable mechanism and to permit pivoting of said cover relative to said base and to permit removal of said cover from said base, said cover defining an incomplete enclosure of said base, and said panel being mounted on said base separate from said cover and cooperable therewith to complete the enclosure of said base.

19. The cabinet according to claim 18 wherein each of said corners are provided with a groove open at its upper end and extending substantially vertically, and the edge members of said cover are provided with pins adapted to be received within said groove, whereby on raising of said cover said pins ride with said groove to effect pivoting action of said cover.

20. The cabinet according to claim 19 wherein said grooves are provided with detent means for retaining said cover in open position.

21. A dust cover for a phonograph cabinet base comprising a first member on said base extending upward therefrom and enclosing a portion of its periphery, a second member adapted to be placed on said base and having an incomplete peripheral portion cooperating with said first member to complete the substantial peripheral enclosure of said base, and means on said second member and base to guide said second member for sliding movement on said base into releasable engagement with said first member to complete the substantial peripheral enclosure of said base.

22. The dust cover according to claim 21, said first member and base including means to releasably secure said first member to said base.

23. The dust cover according to claim 21 wherein said first and second members are provided with cooperable hinge means permitting the pivoting engagement of said one member with respect to the other member and permitting the disengagement of said members from each other and the removal of said second member from said base.

24. A base for supporting a phonograph turntable and pick-up arm comprising a unitary frame member provided with an inwardly extending lip adapted to receive the turntable and pick-up arm, said frame being provided with at least one compartment located along the edge of said frame adjacent the pick-up arm to space the arm from the edge of said frame.

25. The base according to claim 24 wherein a plurality of compartments are depressed below the level of said turntable along said frame edge and are provided with normally closed openable covers.

26. The base according to claim 24 wherein said frame comprises a substantially vertical supporting wall from which said lip extends, and a depending skirt connected to said wall and surrounding the same, the compartments being located between said vertical supporting wall and said depending skirt.

27. The base according to claim 26 including a peripheral edge platform adapted to receive and retain an enclosing dust cover.

28. The base according to claim 27 wherein at least two parallel opposed platform edges are provided enabling sliding location of the dust cover.

29. The base according to claim 24 including turntable securing means for securing the turntable to the base comprising an inverted T-shaped opening for receiving a fastener means having an enlarged surface, said opening being joined at the corner edges of said extending lip wherein the fastener means may be inserted therein.

30. In a phonograph base in which a turntable is to be secured by a fastener means assembly having an enlarged engaging surface and stem, a recess defined in said base for receiving said fastener means assembly comprising a first opening defined in said base and located in a horizontal plane adapted to receive said enlarged engaging surface, a second opening defined in said base and located in a vertical plane adapted to receive said stem, said openings being joined together by a third opening defined in said base whereby said enlarged engaging surface and stem assembly may be inserted while in assembly.

References Cited

UNITED STATES PATENTS

| | | | |
|---|---|---|---|
| 2,971,804 | 2/1961 | Thomas | 312—8 |
| 3,100,671 | 8/1963 | Atkins | 312—284X |
| 3,346,308 | 10/1967 | Zimmermann | 312—8 |
| 3,357,765 | 12/1967 | Molitor | 312—284 |

NILE C. BYERS, Jr., Primary Examiner

UNITED STATES PATENT OFFICE
CERTIFICATE OF CORRECTION

Patent No. 3,549,224 Dated December 22, 1970

Inventor(s) Stanley Bindman

It is certified that error appears in the above-identified patent and that said Letters Patent are hereby corrected as shown below:

Change Claim 15 to read as follows and as noted in paper No. applicant's communication, filed January 15, 1970:

15. A phonograph cabinet comprising a base for supporting a turntable mechanism,
a dust cover cooperable with said base to enclose the turntable mechanism,
a vertical panel member on and forming a part of said base, said panel and said cover having cooperable hinge mean releasably interconnecting the two for pivoting said cover with respect to said panel above said base,
said panel forming a part of said cover to complete the enclosure of the turntable mechanism when the cover coopera with the base to enclose the turntable mechanism.

Signed and sealed this 30th day of March 1971.

(SEAL)
Attest:

EDWARD M.FLETCHER,JR.
Attesting Officer

WILLIAM E. SCHUYLER, JR.
Commissioner of Patents